(12) United States Patent
Murata et al.

(10) Patent No.: US 12,715,379 B2
(45) Date of Patent: Aug. 25, 2026

(54) VEHICLE WHEEL SIDE APPARATUS AND UNDERCARRIAGE WIRING DEVICE

(71) Applicant: SUMITOMO WIRING SYSTEMS, LTD., Yokkaichi (JP)

(72) Inventors: Takahiro Murata, Yokkaichi (JP); Naofumi Yamatake, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 806 days.

(21) Appl. No.: 18/013,714

(22) PCT Filed: Jul. 9, 2021

(86) PCT No.: PCT/JP2021/025917
§ 371 (c)(1),
(2) Date: Dec. 29, 2022

(87) PCT Pub. No.: WO2022/014481
PCT Pub. Date: Jan. 20, 2022

(65) Prior Publication Data

US 2023/0294623 A1 Sep. 21, 2023

(30) Foreign Application Priority Data

Jul. 13, 2020 (JP) ................................ 2020-119749

(51) Int. Cl.
*B60R 16/027* (2006.01)
*B60R 16/023* (2006.01)
*H02G 3/30* (2006.01)

(52) U.S. Cl.
CPC ........ *B60R 16/027* (2013.01); *B60R 16/0239* (2013.01); *H02G 3/30* (2013.01)

(58) Field of Classification Search
CPC .... B60R 16/027; B60R 16/0239; H02G 3/30; B60K 7/00; B62D 7/18
See application file for complete search history.

(56) References Cited

U.S. PATENT DOCUMENTS 1,922,493 A 8/1933 Murray
3,648,491 A 3/1972 Kennard
(Continued)

FOREIGN PATENT DOCUMENTS

CN 107380258 A 11/2017
CN 107848399 A 3/2018
(Continued)

OTHER PUBLICATIONS

JP-2014189107-A English Translation (Year: 2014).*
(Continued)

*Primary Examiner* — Michael T. Walsh
(74) *Attorney, Agent, or Firm* — Oliff PLC

(57) ABSTRACT

A vehicle wheel-side apparatus incorporated into a vehicle wheel rotated around a steering rotation central axis with steering includes: an apparatus body; and a plurality of connection parts provided to the apparatus body, wherein each of the plurality of connection parts is a portion to which a wire-like transmission member extending from a vehicle body is connected, and each of the plurality of connection parts keeps the wire-like transmission member in a posture so that the wire-like transmission member is drawn from the apparatus body toward the steering rotation central axis.

3 Claims, 5 Drawing Sheets

(56) References Cited

U.S. PATENT DOCUMENTS

| | | | | |
|---|---|---|---|---|
| 4,383,148 | A | 5/1983 | Arima et al. | |
| 4,741,713 | A | 5/1988 | Ohlsson et al. | |
| 5,450,320 | A | 9/1995 | Tsubaki et al. | |
| 2007/0234559 | A1 * | 10/2007 | Tokuda | B60K 7/0007 140/92.1 |
| 2008/0078317 | A1 | 4/2008 | Furuya et al. | |
| 2008/0078607 | A1 | 4/2008 | Pattok et al. | |
| 2009/0101429 | A1 | 4/2009 | Williams | |
| 2009/0321171 | A1 | 12/2009 | Hakansson | |
| 2013/0009450 | A1 | 1/2013 | Suzuki et al. | |
| 2013/0234425 | A1 | 9/2013 | Skowronek et al. | |
| 2013/0277128 | A1 | 10/2013 | Gillett | |
| 2013/0284528 | A1 | 10/2013 | Kawasaki et al. | |
| 2014/0318879 | A1 | 10/2014 | Gillett | |
| 2016/0083003 | A1 | 3/2016 | Huang et al. | |
| 2017/0369007 | A1 | 12/2017 | Tamura et al. | |
| 2019/0077342 | A1 | 3/2019 | Okamoto et al. | |
| 2019/0111747 | A1 | 4/2019 | Ishikawa et al. | |
| 2019/0111865 | A1 | 4/2019 | Tamura et al. | |
| 2019/0152505 | A1 | 5/2019 | Hansen et al. | |
| 2024/0059233 | A1 | 2/2024 | Masakiyo et al. | |

FOREIGN PATENT DOCUMENTS

| | | | | |
|---|---|---|---|---|
| CN | 107848403 | A | 3/2018 | |
| CN | 107895605 | A | 4/2018 | |
| CN | 110341461 | A | 10/2019 | |
| DE | 197 56 057 | A1 | 7/1999 | |
| DE | 199 00 083 | A1 | 7/2000 | |
| DE | 102009023527 | A1 | 12/2010 | |
| EP | 3 441 251 | A1 | 2/2019 | |
| EP | 3778268 | A1 * | 2/2021 | B60G 3/06 |
| JP | H06-135253 | A | 5/1994 | |
| JP | 2005-271909 | A | 10/2005 | |
| JP | 2006-62388 | A | 3/2006 | |
| JP | 2006-240430 | A | 9/2006 | |
| JP | 2007-313984 | A | 12/2007 | |
| JP | 2008-308033 | A | 12/2008 | |
| JP | 4780170 | B2 * | 9/2011 | B60L 53/22 |
| JP | 2011-201375 | A | 10/2011 | |
| JP | 2013147084 | A * | 8/2013 | |
| JP | 2013-209016 | A | 10/2013 | |
| JP | 2014189107 | A * | 10/2014 | |
| JP | 2015137065 | A * | 7/2015 | |
| JP | 2016-063608 | A | 4/2016 | |
| JP | 2016088269 | A * | 5/2016 | |
| JP | 2016-107659 | A | 6/2016 | |
| JP | 2017-190117 | A | 10/2017 | |
| JP | 2017-200287 | A | 11/2017 | |
| JP | 2018-065545 | A | 4/2018 | |
| JP | 2020104766 | A * | 7/2020 | |
| WO | 99/30955 | A1 | 6/1999 | |
| WO | 2011/115219 | A1 | 9/2011 | |
| WO | WO-2017175409 | A1 * | 10/2017 | B60G 3/06 |
| WO | 2018/143144 | A1 | 8/2018 | |
| WO | 2022/014477 | A1 | 1/2022 | |

OTHER PUBLICATIONS

JP-2013147084-A English Translation (Year: 2013).*
JP-2016088269-A English Translation (Year: 2016).*
JP-2020104766-A English Translation (Year: 2020).*
JP-2015137065-A English Translation (Year: 2015).*
WO-2017175409-A1 English Translation (Year: 2017).*
EP-3778268-A1 English Translation (Year: 2021).*
JP-4780170-B2 English Translation (Year: 2011).*
Oct. 18, 2024 Office Action issued in Chinese Patent Application No. 202180046018.3.
Jun. 3, 2025 Office Action issued in Japanese Patent Application No. 2020-119758.
Sep. 5, 2024 Office Action issued in U.S. Appl. No. 18/013,621.
Sep. 24, 2024 Office Action issued in U.S. Appl. No. 18/014,041.
Jul. 4, 2023 Office Action issued in Japanese Patent Application No. 2020-119749.
Jul. 4, 2023 Office Action issued in Japanese Patent Application No. 2020-119748.
Jul. 25, 2023 Office Action issued in Japanese Patent Application No. 2020-119752.
Dec. 26, 2023 Office Action issued in Japanese Patent Application No. 2020-119761.
Jun. 26, 2025 Office Action issued in Chinese Patent Application No. 202180046018.3.
Jul. 10, 2025 Office Action issued in Chinese Patent Application No. 202180048225.2.
Jul. 10, 2025 Office Action issued in Chinese Patent Application No. 202180046379.8.
Jul. 14, 2025 Office Action issued in U.S. Appl. No. 18/013,629.
Sep. 7, 2021 International Search Report issued in International Patent Application No. PCT/JP2021/024731.
Sep. 7, 2021 International Search Report issued in International Patent Application No. PCT/JP2021/025916.
Sep. 7, 2021 International Search Report issued in International Patent Application No. PCT/JP2021/025917.
Sep. 14, 2021 International Search Report issued in International Patent Application No. PCT/JP2021/025883.
Sep. 28, 2021 International Search Report issued in International Patent Application No. PCT/JP2021/026063.
Jan. 17, 2023 International Preliminary Report on Patentability issued in International Patent Application No. PCT/JP2021/026063.
Jan. 17, 2023 International Preliminary Report on Patentability issued in International Patent Application No. PCT/JP2021/025883.
Jan. 17, 2023 International Preliminary Report on Patentability issued in International Patent Application No. PCT/JP2021/024731.
Jan. 17, 2023 International Preliminary Report on Patentability issued in International Patent Application No. PCT/JP2021/025916.
Jan. 17, 2023 International Preliminary Report on Patentability issued in International Patent Application No. PCT/JP2021/025917.
U.S. Appl. No. 18/014,041, filed Dec. 30, 2022 in the name of Murata et al.
U.S. Appl. No. 18/013,629, filed Dec. 29, 2022 in the name of Murata et al.
U.S. Appl. No. 18/013,943, filed Dec. 30, 2022 in the name of Murata et al.
U.S. Appl. No. 18/013,621, filed Dec. 29, 2022 in the name of Murata et al.
Feb. 18, 2025 Notice of Allowance issued in U.S. Appl. No. 18/014,041.
Mar. 5, 2025 Notice of Allowance issued in U.S. Appl. No. 18/013,621.
Dec. 4, 2024 Office Action issued in U.S. Appl. No. 18/013,621.
Mar. 27, 2025 Office Action issued in U.S. Appl. No. 18/013,943.
Apr. 8, 2025 Office Action issued in Japanese Patent Application No. 2024-072822.
Aug. 22, 2023 Office Action issued in Japanese Patent Application No. 2020-119758.
Dec. 5, 2023 Office Action issued in Japanese Patent Application No. 2020-119749.
Aug. 22, 2023 Office Action issued in Japanese Patent Application No. 2020-119761.
Apr. 8, 2025 Office Action issued in Chinese Patent Application No. 202180046018.3.
Sep. 30, 2025 Office Action issued in Chinese Patent Application No. 202180045715.7.
Nov. 14, 2025 Notice of Allowance issued in U.S. Appl. No. 18/013,629.
Sep. 29, 2025 Office Action issued in Chinese Patent Application No. 202180048232.2.
Apr. 1, 2026 Office Action issued in Chinese Patent Application No. 202180045715.7.
Mar. 31, 2026 Office Action issued in Chinese Patent Application No. 202180048232.2.

* cited by examiner

VEHICLE WHEEL SIDE APPARATUS AND UNDERCARRIAGE WIRING DEVICE

TECHNICAL FIELD

The present disclosure relates to a vehicle wheel side apparatus and an undercarriage wiring device.

BACKGROUND ART

Patent Document 1 discloses a wiring device supplying an electrical signal from a vehicle body to an in-wheel motor. Patent Document 1 discloses that a plurality of wiring are fixed at a connector portion of a terminal box in the in-wheel motor.

PRIOR ART DOCUMENTS

Patent Document(s)

Patent Document 1: Japanese Patent Application Laid-Open No. 2005-271909

SUMMARY

Problem to be Solved by the Invention

In the technique disclosed in Patent Document 1, the plurality of connector portions on a side of the in-wheel motor are arranged along a vehicle width direction. The plurality of wirings are bent and guided to the side of the in-wheel motor. When the plurality of wirings are bent, an excess portion may occur in an electrical wire. There is a possibility that an irregular deformation occurs in the wiring when a vehicle wheel is rotated with steering.

Accordingly, an object of the present disclosure is to provide a technique capable of routing an undercarriage wire-like transmission member connected to a vehicle wheel side apparatus as straight as possible.

Means to Solve the Problem

A vehicle wheel side apparatus according to the present disclosure is a vehicle wheel side apparatus incorporated into a vehicle wheel rotated around a steering rotation central axis with steering and including: an apparatus body; and a plurality of connection parts provided to the apparatus body, wherein each of the plurality of connection parts is a portion to which a wire-like transmission member extending from a vehicle body is connected, and each of the plurality of connection parts keeps the wire-like transmission member in a posture so that the wire-like transmission member is drawn from the apparatus body toward the steering rotation central axis.

Effects of the Invention

According to the present disclosure, an object is to provide a technique capable of routing an undercarriage wire-like transmission member connected to a vehicle wheel side apparatus as straight as possible.

DESCRIPTION OF EMBODIMENT(S)

Description of Embodiment of Present Disclosure

Embodiments of the present disclosure are listed and described firstly.

A vehicle wheel side apparatus according to the present disclosure is as follows.

(1) A vehicle wheel side apparatus incorporated into a vehicle wheel rotated around a steering rotation central axis with steering includes: an apparatus body; and a plurality of connection parts provided to the apparatus body, wherein each of the plurality of connection parts is a portion to which a wire-like transmission member extending from a vehicle body is connected, and each of the plurality of connection parts keeps the wire-like transmission member in a posture so that the wire-like transmission member is drawn from the apparatus body toward the steering rotation central axis. According to this vehicle wheel side apparatus, each of the plurality of wire-like transmission members is routed as straight as possible from a portion near the steering rotation central axis toward a corresponding connection part. Thus, the undercarriage wire-like transmission member connected to the vehicle wheel side apparatus is routed as straight as possible.

(2) In the vehicle wheel side apparatus according to (1), the plurality of connection parts may be provided to the apparatus body to be arranged along an arc having the steering rotation central axis as a curvature center. The plurality of wire-like transmission members can be routed with a distance as equal as possible from the steering rotation central axis to each connection part.

(3) In the vehicle wheel side apparatus according to (1) or (2), the plurality of connection parts may be three or more connection parts. Three or more connection parts are provided, thus when three or more wire-like transmission members are provided, the three or more wire-like transmission members are routed as straight as possible.

(4) An undercarriage wiring device may include: the vehicle wheel side apparatus according to (1) to (3); a wiring member including a plurality of wire-like transmission members extending from a vehicle body to be connected to the vehicle wheel side apparatus; and a support member supporting the wiring member so that the wiring member goes through the steering rotation central axis. Even when the vehicle wheel is rotated with steering, the wiring member is hardly deformed between the steering rotation central axis and the vehicle wheel side apparatus.

DETAILS OF EMBODIMENT OF PRESENT DISCLOSURE

Specific examples of a vehicle wheel side apparatus and an undercarriage wiring device according to the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
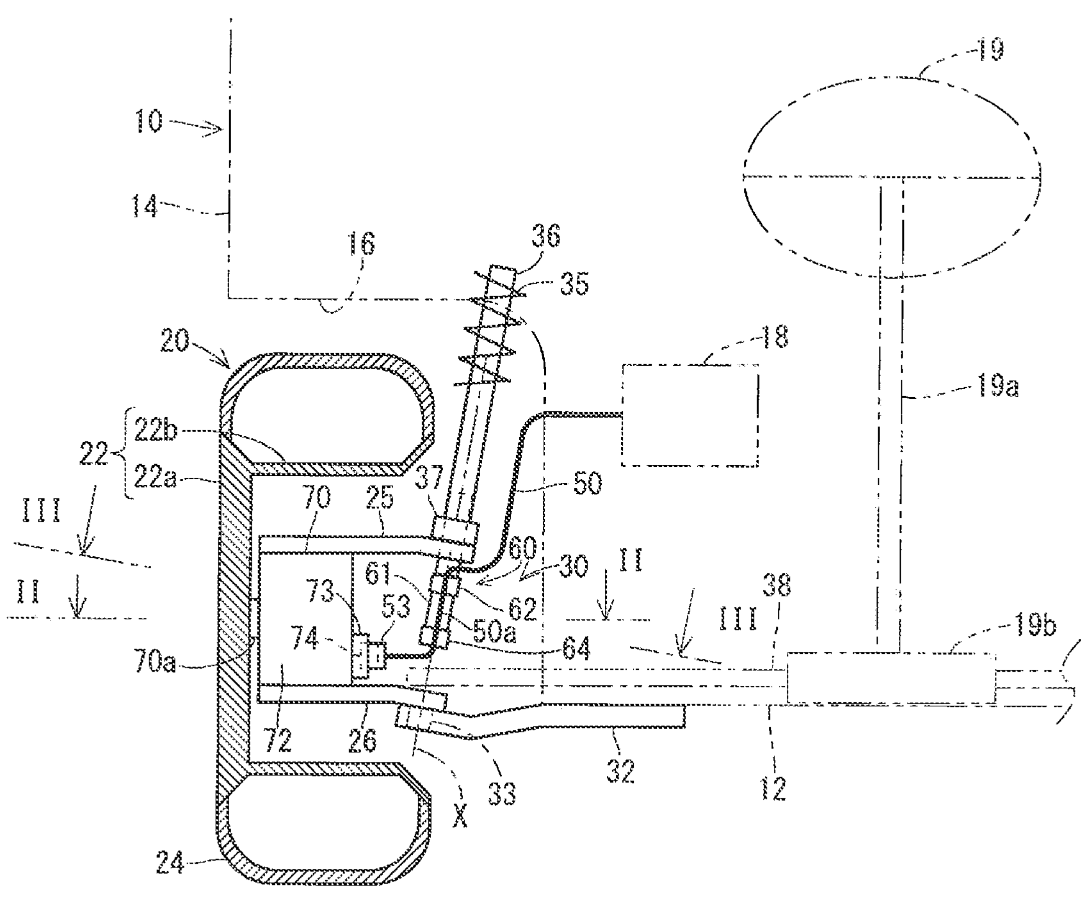
FIG. 1 is a schematic cross-sectional view illustrating an undercarriage wiring device according to an embodiment.
Figure 2:
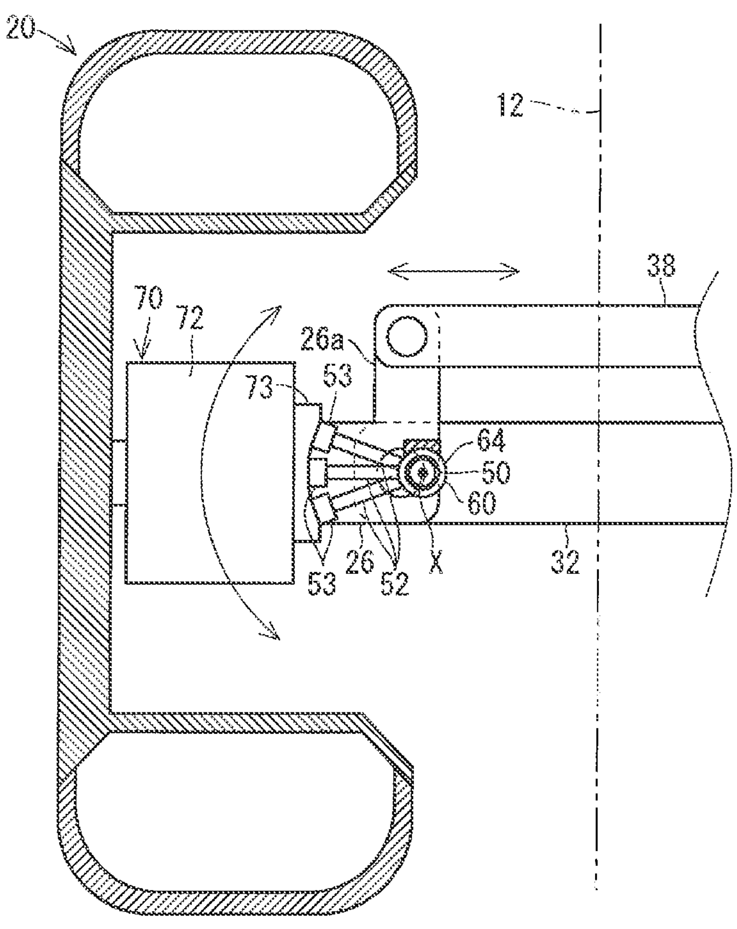
FIG. 2 is a II-II line schematic cross-sectional view in FIG. 1.
Figure 3:
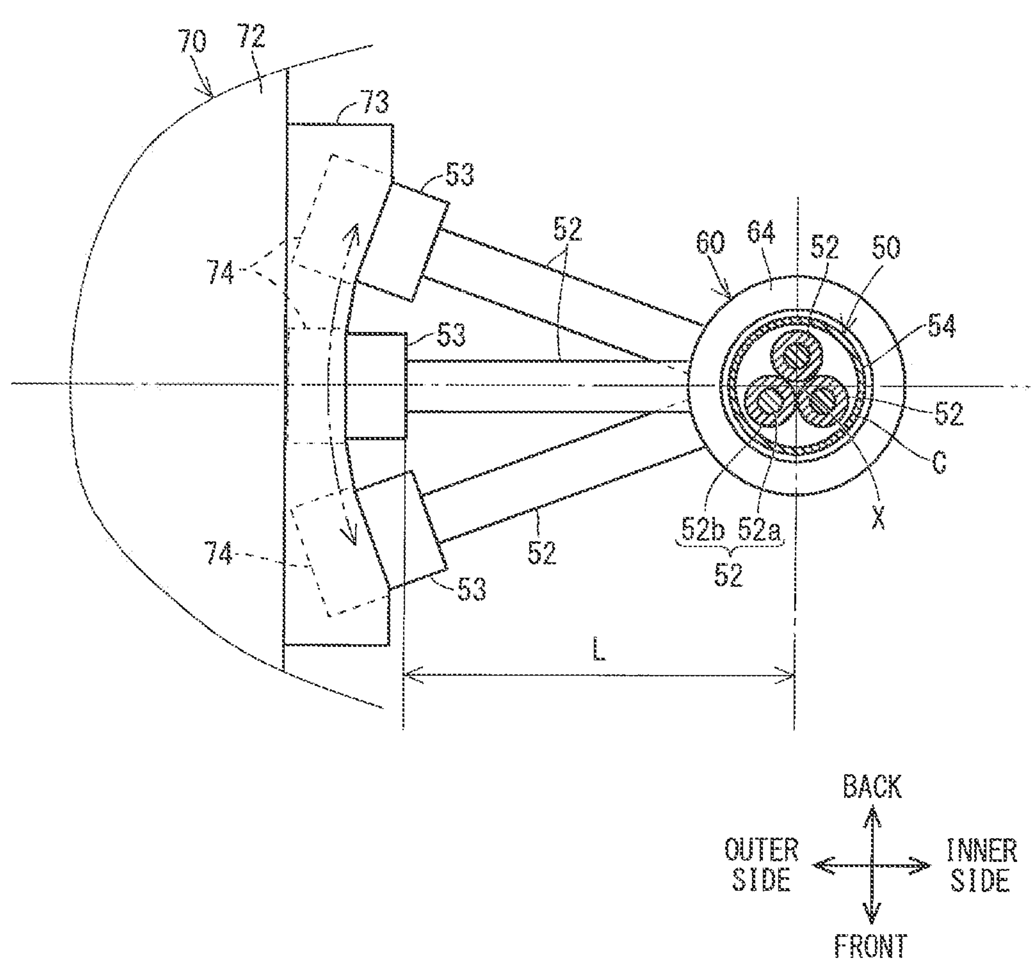
FIG. 3 is a schematic cross-sectional view along a III-III line in FIG. 1.

A vehicle wheel side apparatus and an undercarriage wiring device according to an embodiment is described hereinafter. FIG. 1 is a schematic cross-sectional view illustrating an undercarriage wiring device 30. FIG. 1 is a schematic cross-sectional view of a plane perpendicular to a front-back direction of a vehicle body 10 and passing through a central axis of a vehicle wheel 20. FIG. 2 is a II-II line schematic cross-sectional view in FIG. 1. FIG. 3 is a schematic cross-sectional view along a III-III line in FIG. 1. FIG. 2 mainly illustrates a portion around the vehicle wheel 20. FIG. 3 mainly illustrates a relationship between a steering rotation central axis X, a wiring member 50, and a vehicle wheel side apparatus 70.

The undercarriage wiring device 30 includes the vehicle wheel side apparatus 70, the wiring member 50, and a support member 60. The wiring member 50 is a wiring member connecting a vehicle body side apparatus 18 and a vehicle wheel side apparatus 70. The wiring member 50 is routed along a route connecting the vehicle body side apparatus 18 and the vehicle wheel side apparatus 70. The support member 60 is a member supporting the wiring member 50 so that the wiring member 50 is routed along a predetermined route.

A configuration of a portion where the undercarriage wiring device 30 is provided is described for convenience of description.

The vehicle body 10 to which the undercarriage wiring device 30 is provided is a vehicle body of an automobile. FIG. 1 illustrates a portion around the vehicle wheel 20 on a front side in the vehicle body 10. The vehicle wheel side apparatus 70 in the undercarriage wiring device 30 is incorporated into the vehicle wheel 20 rotated around the steering rotation central axis X with steering. For example, the vehicle wheel 20 is a front wheel. The vehicle wheel side apparatus 70 may be used for a rear wheel when the rear wheel is steered.

The vehicle body 10 includes a floor part 12 and a body part 14. The floor part 12 is a portion facing a ground. The body part 14 is provided to an upper side of the floor part 12 to constitute an exterior of the vehicle body 10. The vehicle body 10 may be a monocoque body made up of a frame and a body as rigid bodies integrated with each other, or may have a configuration in which a body is mounted on a frame. In the present embodiment, a travel direction in a case where an automobile normally travels is referred to as a front, and a side opposite thereto is referred to as a back in some cases.

The vehicle wheel 20 is rotatably supported on the vehicle body 10. In the example illustrated in FIG. 1, the vehicle wheel 20 is rotatably supported in a fender apron 16. Any suspension type such as an independent suspension type, for example, may be applied to a suspension device to support the vehicle wheel 20. FIG. 1 illustrates an example that a lower arm 32 and a damper 36 support the vehicle wheel 20. A suspension device illustrated in FIG. 1 is an example of a strut-type suspension device.

More specifically, the vehicle wheel 20 includes a wheel 22 and a tire 24. The wheel 22 is formed of metal such as iron or aluminum. The wheel 22 includes a disk part **22*a* and a tire attachment part 22*b*. The disk part 22*a* is formed into a circular plate-like shape. The tire attachment part 22*b* is an annular portion protruding from a surrounding area of the disk part 22*a* to an inner side in a vehicle width direction. An annular rim protrudes on both side edges of the tire attachment part 22*b*. The tire 24 formed by an elastic member such as rubber is attached to an outer periphery of the tire attachment part 22*b*** described above.

The vehicle wheel side apparatus 70 is provided to the vehicle wheel 20 described above. Description herein is based on an assumption that the vehicle wheel side apparatus 70 is an in-wheel motor. The in-wheel motor is a motor for traveling incorporated into the vehicle wheel 20 to rotate the vehicle wheel 20. Herein, a shaft **70*a* of the vehicle wheel side apparatus (in-wheel motor) 70 is connected to a central portion of the disk part 22*a* while the vehicle wheel side apparatus 70 is disposed in the tire attachment part 22*b*. Accordingly, the vehicle wheel side apparatus 70 is integrally incorporated into the vehicle wheel 20**.

An upper knuckle part 25 and a lower knuckle part 26 are attached to the vehicle wheel side apparatus 70. The upper knuckle part 25 extends toward an inner side in the vehicle width direction from an upper portion of the vehicle wheel side apparatus 70. The lower knuckle part 26 extends toward the inner side in the vehicle width direction from a lower portion of the vehicle wheel side apparatus 70. An arm part **26*a* receiving force of steering is provided to protrude on the lower knuckle part 26. Herein, the arm part 26*a* extends backward from the inner side in the vehicle width direction in the lower knuckle part 26. When the vehicle wheel side apparatus 70 is not the in-wheel motor, the upper knuckle part 25 and the lower knuckle part 26 described above extend to the inner side in the vehicle width direction from a bearing part rotatably supporting the vehicle wheel 20** in some cases.

The lower arm 32 is a member formed by metal, for example. A base end portion of the lower arm 32 is swingably supported on the floor part 12 in a position on the inner side in the vehicle width direction of the vehicle wheel 20. The axis as a center of swing of the base end portion of the lower arm 32 extends in a front-back direction of the vehicle body 10. The base end portion of the lower arm may be swingably supported on the floor part on an obliquely front side, an inner side, an obliquely back side, or a back side of the vehicle wheel. In these cases, a rotational axis of the swing of the lower arm may extend in a right-left direction of the vehicle body, a front-back direction, or an oblique direction with respect to both the right-left direction and the front-back direction.

A tip end portion of the lower arm 32 extends toward an inner side of the fender apron 16 (herein, toward an outer side in the vehicle width direction) from the floor part 12. A bearing part 33 is provided to the tip end portion of the lower arm 32. The lower knuckle part 26 is rotatably supported on the tip end portion of the lower arm 32 via the bearing part 33. A rotational axis of the bearing part 33 is the steering rotation central axis X around which the vehicle wheel 20 is rotated in the fender apron 16.

The spring 35 and the damper 36 are provided between the upper knuckle part 25 and the vehicle body 10. More specifically, an upper end portion of the damper 36 is supported on the vehicle body 10 on an upper side of the vehicle wheel 20. The upper knuckle part 25 is rotatably supported on the lower end portion of the damper 36 via a bearing part 37. A rotational axis of the bearing part 37 is the steering rotation central axis X around which the vehicle wheel 20 is rotated in the fender apron 16.

As described above, the base end portion of the lower arm 32 is swingably supported on the floor part 12, thus the lower arm 32 supports the vehicle wheel 20 to be movable in an up-down direction in the fender apron 16. The damper 36 intervenes between the upper knuckle part 25 and the vehicle body 10 while a movement direction of the vehicle wheel 20 is regulated by the lower arm 32. The damper 36 and the spring 35 externally mounted to the damper 36 absorb impact by concave-convex portions of a road surface in traveling.

In the present embodiment, a rotational axis of the bearing part 33 and a rotational axis of the bearing part 37 are located on the steering rotation central axis X of the vehicle wheel 20. A central axis of the damper 36 is also located on the steering rotation central axis X of the vehicle wheel 20. The central axis of the damper and the steering rotation central axis X need not coincide with each other.

A tie rod 38 is connected to a tip end portion of the arm part 26*a*. When a steering wheel 19 is rotated with steering by a driver, a rotational movement thereof is transmitted to the tie rod 38 as a movement in the vehicle width direction via a transmission mechanism 19*b* such as a steering shaft 19*a* and a rack-and-pinion mechanism. When the tie rod 38 is moved in the vehicle width direction, the lower knuckle part 26 can be rotated around the rotational axis of the bearing part 33 (that is to say, the steering rotation central axis X). Accordingly, the vehicle wheel 20 can be rotated around the steering rotation central axis X with the steering. A travel direction of the vehicle body 10 is changed by the rotation of the vehicle wheel 20 around the steering rotation central axis X. That is to say, the steering rotation central axis X may be a central axis around which the vehicle wheel 20 is rotated by an operation of the steering wheel 19. The steering rotation central axis X may also be considered an axis closer to a gravity direction than a horizontal direction. The steering rotation central axis X may also be considered a central axis around which the vehicle wheel 20 is rotated to change the travel direction of the vehicle body 10.

The vehicle body side apparatus 18 is provided to a side of the vehicle body 10, and the vehicle wheel side apparatus 70 is provided to a side of the vehicle wheel 20. The vehicle wheel side apparatus 70 is an apparatus incorporated into the vehicle wheel 20 and rotated around the steering rotation central axis X together with the vehicle wheel 20 with respect to the vehicle body 10. As described above, when the vehicle wheel side apparatus 70 is assumed to be the in-wheel motor, the vehicle body side apparatus 18 is assumed to be a drive unit driving the in-wheel motor. For example, when the in-wheel motor is a three-phase induction motor, the vehicle body side apparatus 18 is assumed to be an inverter unit for supplying three-phase alternating current of U phase, V phase, and W phase for driving the in-wheel motor. The vehicle body side apparatus 18 is an apparatus which is provided to the vehicle body 10, and is not rotated even when the vehicle wheel 20 is rotated around the steering rotation central axis X.

The vehicle wheel side apparatus 70 is not necessarily the in-wheel motor. The vehicle wheel side apparatus 70 is assumed to be a sensor or an electrical brake, for example, in place of or in addition to the in-wheel motor. For example, the sensor may be a sensor detecting a rotational speed of a vehicle wheel or a temperature sensor detecting a temperature of an in-wheel motor. The vehicle wheel side apparatus 70 may be an electrical brake including a motor, for example, and performing braking on the rotation of the vehicle wheel 20 using electricity as power. The electrical brake may be an electrical parking brake used in parking or stopping an automobile or a brake used in traveling of an automobile. It is sufficient that the vehicle body side apparatus 18 is an apparatus transmitting or receiving a signal between these vehicle wheel side apparatuses 70 or supplying electrical power. For example, the vehicle body side apparatus 18 may include a function as an electronic control unit (ECU) receiving a signal from a sensor or controlling the electrical brake described above. The vehicle body side apparatus 18 may be provided inside or outside the vehicle body 10. Herein, the vehicle body side apparatus 18 is provided inside the vehicle body 10.

A configuration for connecting the plurality of wire-like transmission members 52 to the vehicle wheel side apparatus 70 is further described hereinafter.

The wiring member 50 includes a plurality of wire-like transmission members 52 extending from the vehicle body 10 to be connected to the vehicle wheel side apparatus 70. The wire-like transmission member 52 is a wire-like transmission medium transmitting electrical power or light. One end portions of the plurality of wire-like transmission members 52 are connected to the vehicle body side apparatus 18. One end portion of the wiring member 50 may be connector-connected to the vehicle body side apparatus 18. The wiring member 50 may be directly drawn from the vehicle body side apparatus 18.

One end portion of the wiring member 50 may be connected to the vehicle body side apparatus 18 via the other wiring member. The other end portions of the plurality of wire-like transmission members 52 are connected to the vehicle wheel side apparatus 70.

Illustrated herein is an example that the wiring member 50 includes a plurality of power source wires 52. The power source wire 52 is an electrical wire in which a covering 52*b* is formed around a core wire 52*a*. The power source wire 52 is a power source wire supplying three-phase alternating current to the in-wheel motor, for example, and FIG. 3 illustrates three power source wires 52. The wiring member 50 may include a signal wire in place of or in addition to the power source wire 52. The wiring member 50 may include an optical fiber cable in place of or in addition to a wire-like transmission member transmitting electrical power.

In the present embodiment, the wiring member 50 is routed to go through the steering rotation central axis X. Herein, the support member 60 supports the wiring member 50 so that the wiring member 50 goes through the steering rotation central axis X. Herein, the state where the wiring member 50 goes through the steering rotation central axis X indicates that there is a positional relationship that the steering rotation central axis X goes through an area in a minimum inclusion circle C in at least one transverse-sectional surface of the wiring member 50 in the longitudinal direction. The minimum inclusion circle C is a minimum circle which can include a portion of the wiring member 50 appearing in the transverse-sectional surface. For example, when the transverse-sectional shape of the wiring member 50 is a circular shape, an outer circle of the wiring member 50 appearing in the transverse-sectional surface is the minimum inclusion circle C. The case where the steering rotation central axis X goes through the area in the minimum inclusion circle C includes a case where the steering rotation central axis X goes through a boundary line of the minimum inclusion circle.

It is sufficient that the steering rotation central axis X goes through the area in the minimum inclusion circle C, thus the case where the wiring member 50 goes through the steering rotation central axis X includes a case where the wiring member 50 intersects with the steering rotation central axis X and a case where a part of the wiring member 50 is in a state of extending along the steering rotation central axis X.

FIG. 1 illustrates an example that a part 50*a* of the wiring member 50 is in a state of extending along the steering rotation central axis X. It is sufficient that the steering rotation central axis X goes through the minimum inclusion circle C, thus the central axis of the wiring member 50 and the steering rotation central axis X need not coincide with each other in a portion of the wiring member 50 extending along the steering rotation central axis X.

That is to say, any positional relationship is applicable as long as the steering rotation central axis X goes through the area in the minimum inclusion circle C in the transverse-sectional surface of the wiring member 50 in a portion of the wiring member 50 going through the steering rotation central axis X (intersecting portion) or a portion of the wiring member 50 extending along the steering rotation central axis X.

It is preferable to increase a length of the portion of the wiring member 50 extending along the steering rotation central axis X to suppress bending deformation of the wiring member 50.

The plurality of power source wires 52 may be collected together in a portion of the wiring member 50 extending along the steering rotation central axis X. Any configuration is applicable to the configuration of collecting the plurality of power source wires 52 together. For example, the plurality of power source wires 52 may be collected together by a protection member 54. For example, the protection member 54 may be a corrugate tube, an adhesive tape helically wound, a sheath extrusion covered to cover the plurality of power source wires 52, or a resin or metal tube.

In a passing part of the wiring member 50 directed from the steering rotation central axis X toward the vehicle wheel side apparatus 70, the plurality of power source wires 52 are not collected but can be separated from each other. For example, the protection member 54 described above is removed in a portion of the wiring member 50 from a lower end portion extending along the steering rotation central axis X to a portion directed toward the vehicle wheel side apparatus 70, thus the plurality of power source wires 52 are exposed and extend from an end portion of the protection member 54. A portion of the wiring member 50 ranging from a portion extending along the steering rotation central axis X to a portion reaching the vehicle body 10 may be covered by the protection member 54.

Portions of the wiring members 50 extending along the steering rotation central axis X are not necessarily collected by the protection member 54, for example. For example, it is also applicable that the protection member 54 described above is omitted, and the plurality of power source wires 52 are collected together by a bracket supporting the wiring member 50 in a constant position. The bracket herein may be the support member 60.

Any shape is applicable as a transverse-sectional outer shape of the wiring member 50. FIG. 3 illustrates an example that the plurality of power source wires 52 are covered by the protection member 54, and the transverse-sectional outer shape of the wiring member 50 is formed into a circular shape. The transverse-sectional outer shape of the wiring member 50 may be an oval shape or a rectangular shape, for example. The transverse-sectional surface is a cross-sectional surface in a plane perpendicular to an axis of the wiring member 50.

The central axis of the wiring member 50 and the steering rotation central axis X need not coincide with each other in a portion of the wiring member 50 extending along the steering rotation central axis X. However, also applicable is a positional relationship in which the steering rotation central axis X goes through the area in the minimum inclusion circle C in the transverse-sectional surface of the wiring member 50 in a portion of the wiring member 50 going through the steering rotation central axis X (intersecting portion), and further a portion of the wiring member 50 extending along the steering rotation central axis X. The minimum inclusion circle C is as described above. The state where the support member 60 supports the wiring member 50 so that the wiring member 50 goes through the steering rotation central axis X includes both cases where the wiring member 50 can be moved and cannot be moved along an extension direction of the steering rotation central axis X while going through the steering rotation central axis X.

Any member is applicable as the support member 60 as long as it supports the wiring member 50 in the routing state described above, and a configuration therefor is not particularly limited. The support member may be a single support member, or may include a plurality of support parts. The support member may be supported on a side of the vehicle body 10 or a side of the vehicle wheel 20. Herein, the state where the support member is supported on the side of the vehicle body 10 indicates that the support member is supported in a portion which is not rotated even when the vehicle wheel 20 is rotated around the steering rotation central axis X. For example, applied is a case where the support member is supported by the damper 36 or the lower arm 32 described above. The state where the support member 60 is supported on the side of the vehicle wheel 20 indicates that the support member 60 is supported in a portion rotated in accordance with a rotation of the vehicle wheel 20 around the steering rotation central axis X. For example, applied is a case where the support member is supported by the upper knuckle part 25 or the lower knuckle part 26 described above.

In the present embodiment, the support member 60 includes an upper support part 62 and a lower support part 64. The lower support part 64 is provided to a lower side of the upper support part 62. The wiring member 50 is supported by the upper support part 62 and the lower support part 64, thus the wiring member 50 goes through the steering rotation central axis X between the upper support part 62 and the lower support part 64.

More specifically, the upper support part 62 and the lower support part 64 are provided between a tip end portion of the upper knuckle part 25 and a tip end portion of the lower knuckle part 26. The tip end portion of the upper knuckle part 25, the upper support part 62, the lower support part 64, and the tip end portion of the lower knuckle part 26 are arranged in this order from an upper side to a lower side at intervals along the steering rotation central axis X. The upper support part 62 and the lower support part 64 are supported on the tip end portions of the damper 36 by an extension support part 61. The extension support part 61 detours from the tip end portion of the upper knuckle part 25 while being directed from the lower end portion of the damper 36 to the lower side in a posture in parallel to the steering rotation central axis X. The extension support part 61 may be fixed to the damper 36 by welding or screwing, for example. A tip end portion of the extension support part 61 reaches a near side of the tip end portion of the lower knuckle part 26. The upper support part 62 and the lower support part 64 are supported by the damper 36 via the extension support part 61, thus do not follow the rotation of the vehicle wheel 20 around the steering rotation central axis X. Accordingly, the upper support part 62 and the lower support part 64 are supported on the side of the vehicle body 10.

The upper support part 62 is supported on an intermediate portion in an extension direction of the extension support part 61. The upper support part 62 may be integrally formed with the extension support part 61, or may also be fixed to the extension support part 61 by welding or screwing, for example. The upper support part 62 is provided in a position on the lower side away from the tip end portion of the upper knuckle part 25 along the steering rotation central axis X. In this arrangement position, the upper support part 62 supports a part of the wiring member 50 at a position on the steering rotation central axis X. It is sufficient that the upper support part 62 supports a part of the wiring member 50 in a constant position. For example, the upper support part 62 may be an annular member having a hole into which the wiring member 50 is inserted. The upper support part 62 may have a configuration that a pair of sandwiching pieces are screwed while sandwiching a part of the wiring member 50. The upper support part 62 may have a configuration of having a swaging piece swaged and fixed to a part of the wiring member 50. The upper support part 62 may support a part of the wiring member 50 while not allowing a rotation thereof.

The lower support part 64 is supported on the tip end portion of the extension support part 61. The lower support part 64 may be integrally formed with the extension support part 61, or may also be fixed to the extension support part 61 by welding or screwing, for example. The lower support part 64 is provided in a position on the lower side away from the upper support part 62 and on the upper side away from the tip end portion of the lower knuckle part 26 along the steering rotation central axis X. In this arrangement position, the lower support part 64 supports a part of the wiring member 50 at a position on the steering rotation central axis X. It is sufficient that the lower support part 64 supports a part of the wiring member 50 in a constant position. For example, the lower support part 64 may have a configuration similar to the upper support part 62 described above.

The lower support part 64 may have a configuration of supporting the wiring member 50 while allowing the rotation thereof around the steering rotation central axis X. For example, FIG. 3 illustrates an example that the lower support part 64 is formed into an annular shape, and an inner diameter thereof is larger than a minimum inclusion circle in a transverse-sectional surface of the other part of the wiring member 50. A gap is formed between the wiring member 50 and an inner peripheral portion of the lower support part 64 in a state where the wiring member 50 is inserted into the lower support part 64. Thus, the wiring member 50 can be rotated in the lower support part 64.

The wiring member 50 extends from the vehicle body side apparatus 18 in the vehicle body 10 to pass through the fender apron 16, and is led toward the tip end portion of the upper knuckle part 25. The wiring member 50 goes through an area between the tip end portion of the upper knuckle part 25 and the upper support part 62, and is supported on the steering rotation central axis X by the upper support part 62. Furthermore, the wiring member 50 is led toward the lower support part 64, and is supported on the steering rotation central axis X by the lower support part 64. A portion of the wiring member 50 between the upper support part 62 and the lower support part 64 is a portion supported along the steering rotation central axis X. Furthermore, the plurality of power source wires 52 in the wiring member 50 go through the area between the lower support part 64 and the tip end portion of the lower knuckle part 26 to extend toward the vehicle wheel side apparatus 70, and is connected to the vehicle wheel side apparatus 70.

When the lower support part 64 rotatably supports the wiring member 50, twist of the wiring member 50 caused by the rotation of the vehicle wheel 20 around the steering rotation central axis X can be transmitted to the portion of the wiring member 50 between the lower support part 64 and the upper support part 62. Thus, a portion of the wiring member 50 extending along the steering rotation central axis X can be twisted and deformed in accordance with the rotation of the vehicle wheel 20 with steering. When the upper support part 62 supports the wiring member 50 while not allowing the rotation of the wiring member 50, the twist of the wiring member 50 is hardly transmitted to the portion of the wiring member 50 on the side of the vehicle body 10 compared with the upper support part 62.

The configuration described above is not necessary as the configuration that the lower support part 64 rotatably supports the wiring member 50. For example, also applicable is a configuration that the lower support part 64 includes an outer side body part and an inner side rotation support part, the outer side body part is supported on a damper by the extension support part, and the inner side rotation support part is rotatably supported on the outer side body part. Adoptable as the lower support part are various types of bearing structure such as a rolling bearing or a fluid bearing, for example. The inner side rotation support part may support the wiring member while allowing the rotation thereof, or may support the wiring member while not allowing the rotation thereof. In the latter case, when the wiring member is twisted, the inner side rotation support part is rotated with respect to the outer side body part, thus friction hardly occurs between the wiring member and the inner side rotation support part, for example.

The other end portions of the plurality of power source wires 52 are directed from the steering rotation central axis X to the vehicle wheel side apparatus 70. A connector 53 is provided to the other end portion of each of the plurality of power source wires 52. The plurality of connectors 53 are separated from each other. Each of the plurality of power source wires 52 is connected to the vehicle wheel side apparatus 70 via the connector 53. The plurality of connectors 53 may be integrated with each other in a state of being connectable to a plurality of connectors 74 described hereinafter.

The vehicle wheel side apparatus 70 includes an apparatus body 72 and the plurality of (three herein) connectors 74. The plurality of connectors 74 are an example of connection parts connecting a wire-like transmission member to the vehicle wheel side apparatus 70. The shaft **70*a* described above is provided to the apparatus body 72. The apparatus body 72 is connected to the vehicle wheel 20 via the shaft 70*a*. The plurality of connectors 74 are provided to the apparatus body 72. Each of the plurality of connectors 74 is a part to which the connector 53 on the other end portion of each of the plurality of power source wires 52 is connected. The connection between the connector 53 and the connector 74 may be achieved by fitting a male terminal and a female terminal to each other between the connectors 53 and 74**, or may also be achieved by connecting those terminals by screwing, for example.

Each of the plurality of connectors 74 keeps the power source wire 52 in a posture so that the power source wire 52 is drawn from the apparatus body 72 toward the steering rotation central axis X. Each of the plurality of connectors 74 preferably keeps the power source wire 52 in the posture described above in a position different from each other around the steering rotation central axis X. Herein, the state where the connector 74 keeps the power source wire 52 in the posture so that the power source wire 52 is drawn from the apparatus body 72 toward the steering rotation central axis X indicates that, for example, when a portion of the power source wire 52 drawn from the connector 74 extends, the power source wire 52 is in a state of passing through the steering rotation central axis X described above.

Herein, the plurality of connectors 74 are provided to the apparatus body 72 in a posture of being directed to the steering rotation central axis X. Herein, the state where the connector 74 is directed to the steering rotation central axis X indicates a posture of the connector 74 that, for example, a virtual extension region extending in a connection direction of the connector 53 to the connector 74 passes through the steering rotation central axis X described above based on the connector 74 as a start region (a central portion of the connector 74 in a width direction is preferably a start point), and a portion of the connector 74 on a side to which the connector 53 is connected faces a side of the steering rotation central axis X.

The connection direction of the connector 53 to the connector 74 coincides with the direction in which the connector 74 is directed to the steering rotation central axis X. An extension direction of the power source wire 52 from the connector 53 is directed to a side opposite to a side of the connector 53 connected to the connector 74. Thus, when the connector 53 is connected to the connector 74, the power source wire 52 extending from a back portion of the connector 53 is drawn to be directed to the steering rotation central axis X in accordance with an orientation direction of the connector 74.

Herein, a base part 73 is provided to an inner portion of the apparatus body 72 in a vehicle width direction. An inner portion of the base part 73 in the vehicle width direction has a shape gradually concaved from both outer portion toward a central portion in a width direction thereof (a front-back direction on a vehicle body basis).

The base part 73 is provided to an outer side of the steering rotation central axis X in the vehicle width direction while the vehicle wheel 20 is located in a neutral position (a state where the vehicle travels straight). One of the three connectors 74 is provided to a central portion of the base part 73 in the width direction, and is directed inside along the vehicle width direction to be directed to the steering rotation central axis X. The other two connectors 74 are provided to both end sides of the base part 73 in the width direction. One end portion of the base part 73 in the width direction (a front portion in the front-back direction of the vehicle) is directed obliquely backward with respect to an inward direction of the vehicle width, thus the connector 74 provided to this portion is directed obliquely backward with respect to the inward direction of the vehicle width to be directed to the steering rotation central axis X. The other end portion of the base part 73 in the width direction (a back portion in the front-back direction of the vehicle) is directed obliquely forward with respect to an inward direction of the vehicle width, thus the connector 74 provided to this portion is directed obliquely forward with respect to the inward direction of the vehicle width to be directed to the steering rotation central axis X. It is also applicable that the plurality of connectors 74 are connectors each having a concave portion to which the connector 53 is connected, and are provided to be directed to the steering rotation central axis X while being embedded in the apparatus body 72. The plurality of connectors 74 may protrude from the apparatus body 72 or the base part 73. Three connectors 74 may have a configuration of being integrated by the base part 73 as described above, or may also be separately provided to the apparatus body.

Each of the plurality of power source wires 52 described above extends from the steering rotation central axis X toward the corresponding connector 74, and the connector 53 on the end portion thereof extends to the corresponding connector 74. That is to say, one of the three power source wires 52 extends straight from the steering rotation central axis X toward an outer side in the vehicle width direction, and is connected to the connector 74 located in a center in the three connectors 74. The other one of the three power source wires 52 extends straight obliquely backward with respect to the outward direction in the vehicle width direction from the steering rotation central axis X, and is connected to the connector 74 on a back side of the vehicle body 10 in the front-back direction. The still other one of the three power source wires 52 extends straight obliquely forward with respect to the outward direction in the vehicle width direction from the steering rotation central axis X, and is connected to the connector 74 on a front side of the vehicle body 10 in the front-back direction. That is to say, three power source wires 52 radially extend straight from the steering rotation central axis X as a center.

The plurality of connectors 74 may be provided to the apparatus body 72 to be arranged along an arc having the steering rotation central axis X as a curvature center. In other words, the plurality of connectors 74 may be provided in a position with an equal distance from the steering rotation central axis X when viewed along the steering rotation central axis X. FIG. 2 and FIG. 3 also illustrate an example that the plurality of connectors 74 are arranged along the are having the steering rotation central axis X as the curvature center.

There may be a connector which is not directed to the steering rotation central axis X in addition to the plurality of connectors 74 described above.

According to the vehicle wheel side apparatus 70 and the undercarriage wiring device 30 having such configurations, the plurality of connectors 74 of the vehicle wheel side apparatus 70 are directed to the steering rotation central axis X. Thus, portions of the plurality of wire-like transmission members (power source wires herein) 52 ranging from the steering rotation central axis X to the vehicle wheel side apparatus 70 are routed as straight as possible toward the corresponding connectors 74. Thus, occurrence of bending or loosening, for example, of the plurality of wire-like transmission members (the power source wires herein) 52 can be suppressed, and an excess portion caused by such a state hardly occurs. A bending position or a loosened position is reduced, thus irregular bending hardly occurs in steering, and as a result, interference with surrounding components is suppressed. A space considering bending, loosening, and further irregular bending deformation needs not be ensured, thus an arrangement space can be reduced.

The power source wire 51 is thick in many cases. Thus, a route center thereof needs to be separated from each other, for example, and limitation caused by a route setting is imposed in many cases. The configuration described above is applied to the plurality of power source wires 52 as with the present embodiment, thus the plurality of power source wires 52 can be routed as straight as possible.

When three or more connectors 74 are included, a difference of a route easily occurs between the power source wires 52. As described above, in the case where the plurality of connectors 74 include three or more connectors 74, when the plurality of connectors 74 are directed to the steering rotation central axis X, the power source wires 52 connected to the plurality of connectors 74 can be routed straight.

Also in a configuration that two connectors are provided to the vehicle wheel side apparatus, when two connectors are directed to the steering rotation central axis X, the wire-like transmission members connected to the connectors, respectively, are routed straight from the steering rotation central axis X to the corresponding connectors.

When the plurality of connectors 74 are provided to the apparatus body 72 to be arranged along the arc having the steering rotation central axis X as the curvature center, the plurality of power source wires 52 can be routed with a distance as equal as possible from the steering rotation central axis X to each connector 74. Accordingly, each power source wire 52 can be set to have a length as equal as possible, and manufacture and manufacture management, for example, can be easily performed.

The plurality of connectors may not be arranged along the arc having the steering rotation central axis X as the curvature center. Also in this case, each power source wire 52 can be routed straight from the steering rotation central axis X to the corresponding connector.

The support member 60 supports the wiring member 50 to go through the steering rotation central axis X, thus even when the vehicle wheel 20 is rotated with steering, the wiring member 50 is hardly bent and deformed between the steering rotation central axis X and the vehicle wheel side apparatus 70. Accordingly, the wiring member 50 has a longer life.

Figure 4:
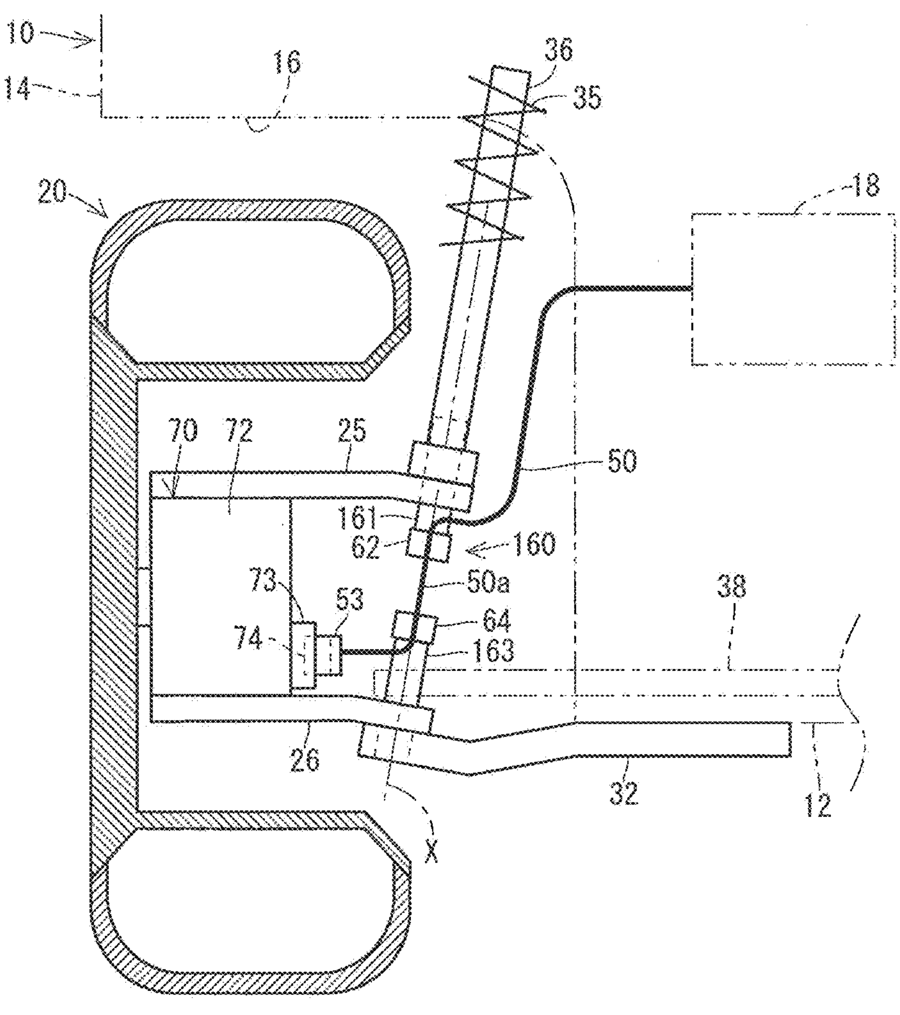
FIG. 4 is a schematic cross-sectional view illustrating a support member according to a modification example.

FIG. 4 is a schematic cross-sectional view illustrating a support member 160 according to a modification example. In the present modification example, an extension support part 161 corresponding to the extension support part 61 supports the upper support part 62 and does not support the lower support part 64 in the support member 160.

The lower support part 64 is supported on the lower knuckle part 26. That is to say, an extension support part 163 is provided to be directed to an upper side along the steering rotation central axis X from the tip end portion of the lower knuckle part 26. The lower support part 64 is supported on the tip end portion of the extension support part 161. The extension support part 161 may be welded or screwed to the lower knuckle part 26 and the lower support part 64, or may also be integrally formed therewith.

In the present modification example, the lower support part 64 is supported on the lower knuckle part 26 via the extension support part 163. Thus, when the vehicle wheel is rotated around the steering rotation central axis X, the lower support part 64 is also rotated around the steering rotation central axis X. Thus, even when the lower support part 64 supports the wiring member 50 while not allowing the rotation thereof in the manner similar to the support structure by the upper support part 62, the wiring member 50 can be twisted between the upper support part 62 and the lower support part 64.

In this case, it is sufficient that the lower support part 64 is supported on the side of the vehicle wheel 20. For example, the lower support part 64 may be supported on the vehicle wheel side apparatus 70, for example, via the other support member. That is to say, the lower support part 64 is rotated around the steering rotation central axis X, thus may also be directly or indirectly supported in a portion which is not rotated around the travel rotational axis.

The plurality of power source wires 52 may be routed straight from the lower support part 64 toward each connector 74 also in the present modification example.

The configuration that the support member 60 includes the upper support part 62 and the lower support part 64 is not necessary.

Figure 5:
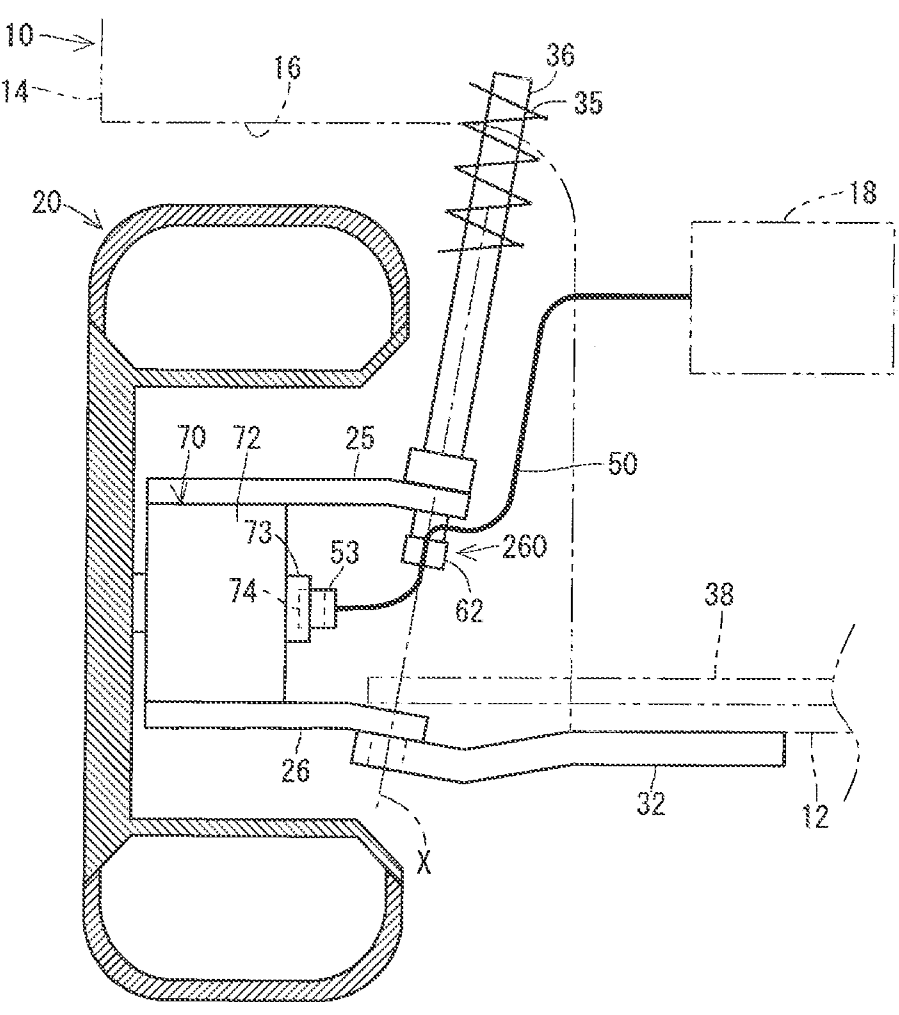
FIG. 5 is a schematic cross-sectional view illustrating a support member according to another modification example.

For example, as with the modification example illustrated in FIG. 5, the lower support part 64 may be omitted. That is to say, in the present modification example, a support member 260 has a configuration similar to that in the embodiment described above except that the lower support part 64 is omitted. In this case, the wiring member 50 extends from the support member 260 toward the vehicle wheel side apparatus 70 to be connected to the vehicle wheel side apparatus 70.

The plurality of power source wires 52 may be routed straight from the support member 260 toward each connector 74 also in the present modification example.

When the vehicle wheel 20 is rotated with steering, suppressed is a variation of distance from a portion supported on the steering rotation central axis X by the support member 260 to the vehicle wheel side apparatus 70 in the wiring member 50. Accordingly, bending deformation of the wiring member 50 is suppressed in the case where the vehicle wheel 20 is rotated with steering.

Each configuration described in the embodiment and each modification example can be appropriately combined as long as they are not contradictory.

EXPLANATION OF REFERENCE SIGNS

10 vehicle body
12 floor part
14 body part
If fender apron
18 vehicle body side apparatus
19 steering wheel
19*a* steering shaft
19*b* transmission mechanism
20 vehicle wheel
22 wheel
22*a* disk part
22*b* tire attachment part
24 tire
25 upper knuckle part
26 lower knuckle part
26*a* arm part
30 undercarriage wiring device
32 lower am
33 bearing part.
35 spring
36 damper
37 bearing part
38 tie roid
50 wiring member
50*a* part
52 wire-like transmission member
52 power source wire
52*a* core wire
526 covering
53 connector
54 protection member
60 support member
61 extension support
62 upper support part
64 lower support part
70 vehicle wheel side apparatus
70*a* shaft
72 apparatus body
73 base part

74 connector
160 support member
161 extension support part
163 extension support part
260 support member
C minimum inclusion circle
X steering rotation central axis

The invention claimed is:

1. A vehicle wheel side apparatus incorporated into a vehicle wheel rotated around a steering rotation central axis with steering, comprising:

an apparatus body; and a plurality of connection parts provided to the apparatus body, wherein each of the plurality of connection parts is a portion to which a wire-like transmission member extending from a vehicle body is connected, each of the plurality of connection parts keeps the wire-like transmission member in a posture so that the wire-like transmission member is drawn from the apparatus body toward the steering rotation central axis, and the plurality of connection parts is arranged along an are having the steering rotation central axis as a curvature center.

2. The vehicle wheel side apparatus according to claim 1, wherein the plurality of connection parts comprises three or more connection parts.

3. An undercarriage wiring device, comprising:

the vehicle wheel side apparatus according to claim 1;

a wiring member including a plurality of wire-like transmission members extending from a vehicle body to be connected to the vehicle wheel side apparatus; and a support member supporting the wiring member so that the wiring member is routed in a direction that is parallel with the steering rotation central axis.

* * * * *